US007632185B2

(12) United States Patent
Solomon et al.

(10) Patent No.: US 7,632,185 B2
(45) Date of Patent: Dec. 15, 2009

(54) PORTABLE PROJECTION GAMING SYSTEM

(75) Inventors: Mark C. Solomon, Corvallis, OR (US); Glen A. Oross, Corvallis, OR (US); Peter On, Corvallis, OR (US); Stephen J Brown, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 11/261,340

(22) Filed: Oct. 28, 2005

(65) Prior Publication Data

US 2007/0099700 A1 May 3, 2007

(51) Int. Cl.
*A63F 9/24* (2006.01)
*A63F 13/00* (2006.01)

(52) U.S. Cl. ............................ 463/34; 463/37; 463/38; 345/156; 345/173; 345/204; 455/556.1

(58) Field of Classification Search .................... 463/34
See application file for complete search history.

(56) References Cited

U.S. PATENT DOCUMENTS

| | | | | |
|---|---|---|---|---|
| 3,756,710 | A | 9/1973 | Taylor | |
| 4,021,105 | A * | 5/1977 | Schubach | 353/119 |
| 4,059,351 | A | 11/1977 | Wisotsky | |
| D254,195 | S | 2/1980 | Genaro et al. | |
| 4,504,110 | A * | 3/1985 | Pittenger | 359/210 |
| D287,145 | S | 12/1986 | Shilton et al. | |
| RE32,662 | E | 5/1988 | Pennington | |
| 4,976,429 | A | 12/1990 | Nagel | |
| 5,213,327 | A * | 5/1993 | Kitaue | 463/38 |
| 5,683,297 | A | 11/1997 | Raviv et al. | |
| 5,795,227 | A | 8/1998 | Raviv et al. | |
| D411,586 | S | 6/1999 | Fai | |
| 6,806,850 | B2 | 10/2004 | Chen | |
| D513,042 | S * | 12/2005 | Kim et al. | D21/330 |
| 2001/0046034 | A1* | 11/2001 | Gold et al. | 353/72 |
| 2003/0038928 | A1* | 2/2003 | Alden | 353/122 |
| 2003/0043124 | A1* | 3/2003 | Kim et al. | 345/204 |
| 2003/0053206 | A1* | 3/2003 | Togino | 359/434 |
| 2003/0132921 | A1* | 7/2003 | Torunoglu et al. | 345/173 |
| 2003/0165048 | A1* | 9/2003 | Bamji et al. | 361/681 |
| 2003/0220141 | A1* | 11/2003 | Corrigan et al. | 463/36 |

(Continued)

FOREIGN PATENT DOCUMENTS

EP 1 524 850 A1 4/2005

(Continued)

OTHER PUBLICATIONS

Position Sensitive Device from Wikipedia, accessed May 23, 2008 <http://en.wikipedia.org/w/index.php?title=Position_sensitive_device&printable=yes>.*

*Primary Examiner*—John M. Hotaling, II
*Assistant Examiner*—Paul A. D'Agostino

(57) ABSTRACT

A handheld projection gaming system includes a projection gaming device having a control portion and a projector portion, and an external user input device. The control portion is configured to be held in a handheld position, and includes control devices configured for manipulation by a user. The projector portion is configured to project a video image. The external user input device is configured to operably couple to and support the handheld gaming device and includes at least one control device configured for interactive manipulation by the user.

30 Claims, 5 Drawing Sheets

U.S. PATENT DOCUMENTS

| | | | | |
|---|---|---|---|---|
| 2005/0099607 | A1 | 5/2005 | Yokote et al. | |
| 2006/0103811 | A1 * | 5/2006 | May et al. | 353/69 |
| 2006/0146015 | A1 * | 7/2006 | Buchmann | 345/156 |
| 2006/0172767 | A1 * | 8/2006 | Cathey et al. | 455/556.1 |
| 2006/0223635 | A1 * | 10/2006 | Rosenberg | 463/37 |
| 2007/0064199 | A1 * | 3/2007 | Schindler et al. | 353/30 |

FOREIGN PATENT DOCUMENTS

| | | | |
|---|---|---|---|
| WO | WO 2005/034523 | A1 | 4/2005 |

* cited by examiner

PORTABLE PROJECTION GAMING SYSTEM

BACKGROUND

Video games and the like have become increasingly popular and sophisticated in recent years. Improvements in computer and video technology and computer graphics have made video games faster, more challenging, more variable, and more realistic. At the same time, improvements in computer technology have also made video game hardware smaller and less power-consuming. The result has been the miniaturization of high quality video game devices and the introduction of a wide variety of portable gaming devices.

While improvements in computer technology have made video game devices smaller and more powerful, some limitations still generally apply, particularly with respect to the video images associated with these games. High quality, high-resolution video is particularly desirable in video games to provide a realistic experience. However, high quality graphics images require substantial computing power and speed, and high quality displays.

In recent years the computing power required for high quality video has become less expensive, smaller in size, and with lower power requirements. However, the challenge of providing high quality video images in portable devices has not been so easily solved. High resolution graphics are best viewed on a large display, but large displays are not practical to carry around, because of their size and weight. Consequently, portable gaming devices generally use a relatively small liquid crystal display (LCD) that provides far less resolution. While higher resolution displays could be used for the small units, resolution significantly higher than industry standard is significantly more expensive, and in a small display the apparent improvement in image quality can be minimal.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
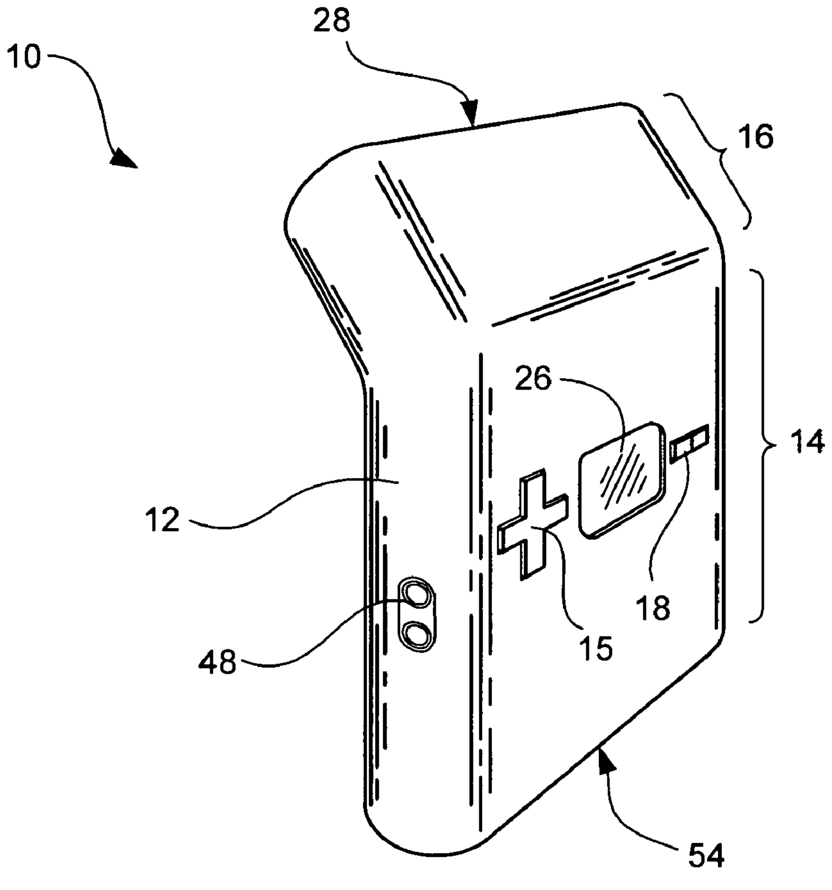
FIG. 1 is a perspective view of an embodiment of a portable projection gaming device.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

In order to provide better video images in a portable gaming device, the inventors have combined the advantages of a miniature projection system with a portable gaming device to provide a portable projection gaming device. The device is an ergonomically designed, handheld device that projects its video display onto any desired surface. The handheld gaming device can also be docked with a specially configured computer-type keyboard, providing a projection gaming system configured for control and input in the manner of interactive personal computer games.

Figure 7:
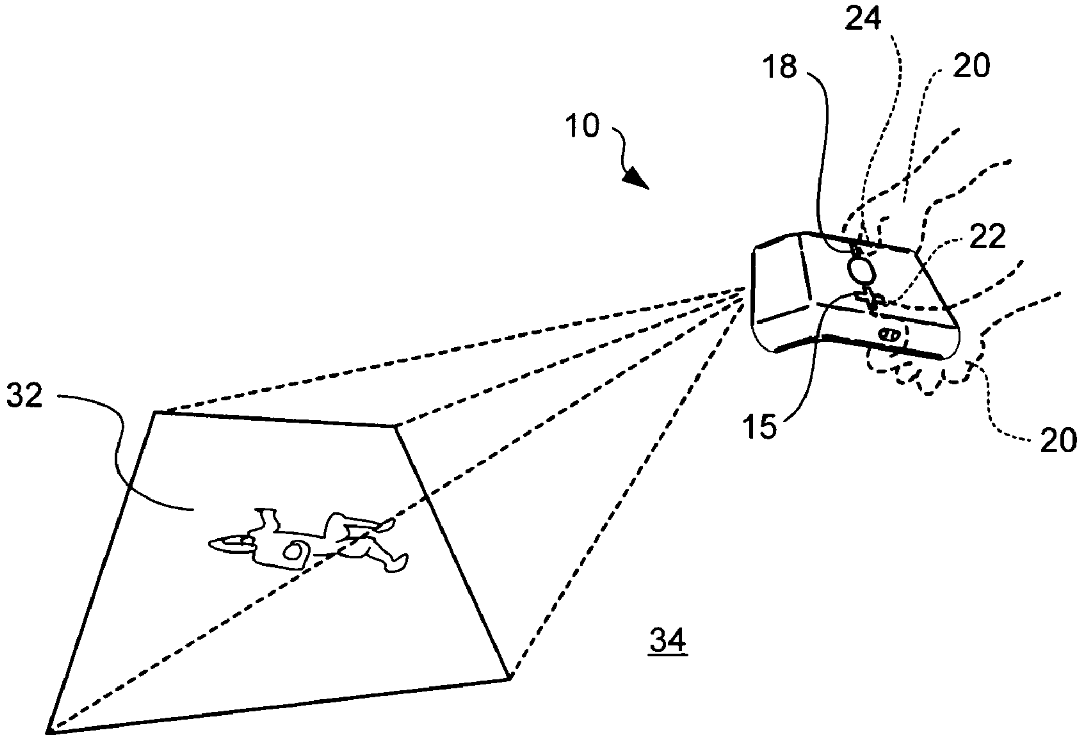
FIG. 7 is a perspective view of a user using an embodiment of a portable projection gaming device to project a gaming image upon a projection surface.
Figure 8:
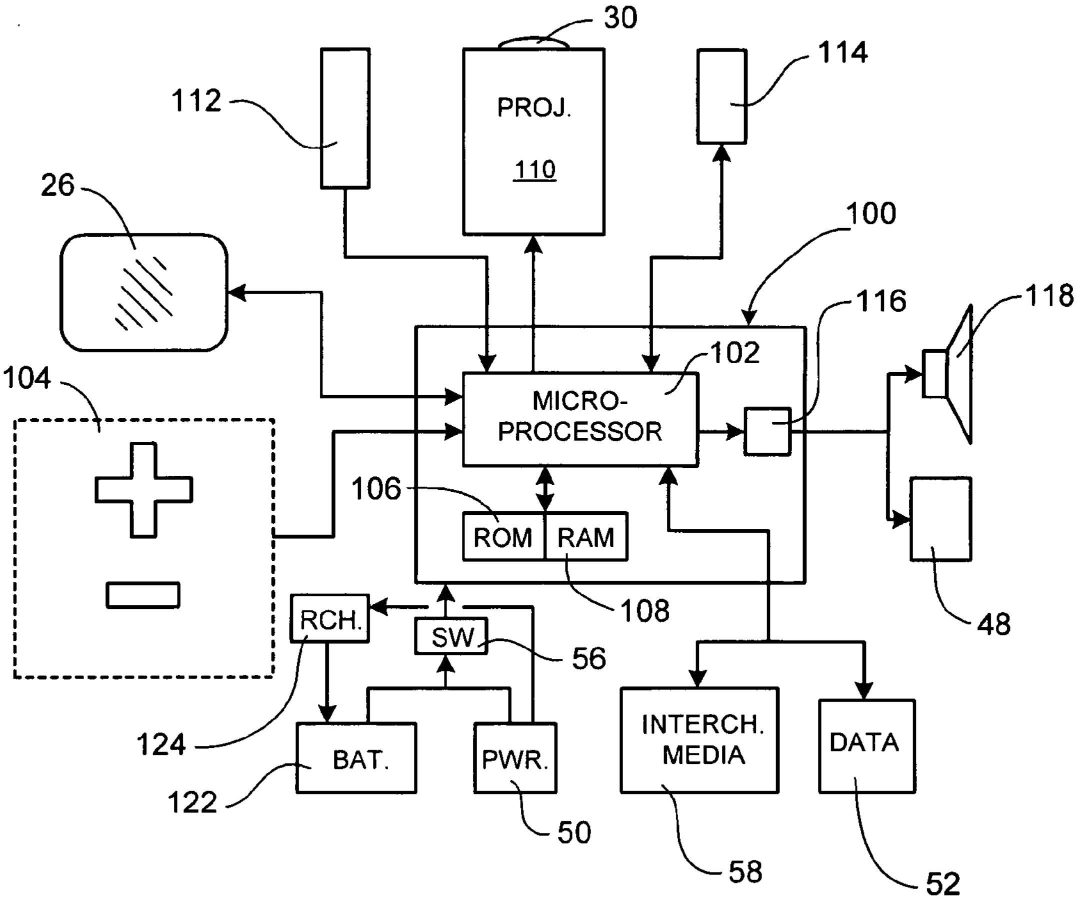
FIG. 8 is a block diagram of the operational components of one embodiment of a portable projection gaming device.

A perspective view of one embodiment of a portable projection gaming device 10 is shown in FIG. 1, and a block diagram of the functional components of one embodiment of the portable projection gaming device is provided in FIG. 8. Referring to FIG. 1, the device includes a substantially integral body 12, configured to be held in a user's hands (20 in FIG. 7). The device generally includes a control portion 14, and a projector portion 16. The projector portion is oriented at a downward angle (angle A in FIG. 3) relative to the control portion. As used herein, the term "gaming device" is intended to refer to interactive gaming devices that allow a user to interact, whether alone or against one or more opponents, in a digital environment that provides visual output. Additionally, as noted below, the device also includes audio capabilities.

The control portion 14 includes control devices that are configured for manipulation by a user while holding the device in the hands. The control devices can include a multi-position directional switch 15, such as the four-position switch shown, and a selection switch 18. The directional switch and devices like it are widely used in gaming devices to allow multi-directional control input for controlling video game elements, such as the direction of motion of a video element or character, or the aiming of a weapon, for example. It is to be understood that other multi-directional control devices that are not shown can also be provided, such as a rollerball or a joystick.

The selection switch 18 shown in FIG. 1 is a two-position rocker switch that can provide a variety of functions in a video game environment, such as firing a weapon, or selecting game parameters, etc. It will be apparent that other types of control devices, beyond those shown, can also be used, such as push buttons, slide switches, triggers, etc. As shown in the block diagram of FIG. 8, the functional components of the device can include a controller 100, having a microprocessor 102. The microprocessor is programmed and configured to receive input from the control devices, denoted collectively at 104, to allow control of the operation of the various components of the device, as described in more detail below. Associated with the microprocessor is a memory block including read-only memory (ROM) 106 and random access memory (RAM) 108. Permanent operational instructions for the microprocessor can be stored in ROM, while individual programs and other information can be stored in RAM for use by the microprocessor.

The control devices shown in FIG. 1 are configured and positioned for easy manipulation by a user when holding the device in the hands. For example, as shown in FIG. 7, when the device is held in the hands 20 of a user, the user's left thumb 22 is naturally positioned over the multi-position directional switch 15, and the right thumb 24 is positioned over the selection switch 18. This configuration makes the device easy to grasp while using, and also makes it easy to learn to use.

Figure 4:
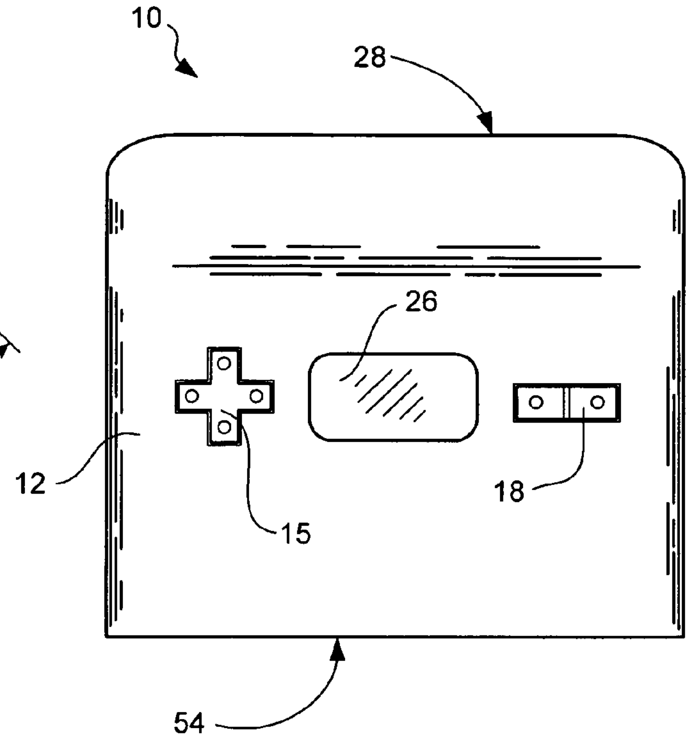
FIG. 4 is a rear view of the gaming device embodiment of FIG. 1, showing the controls.

Referring back to FIGS. 1 and 4, the control portion 14 can also include an operational display 26, such as a small LCD display screen (backlit or otherwise) located between the directional switch 15 and the selector switch 18. This display can be used for any purpose related to using and/or controlling the projection device, and can work in conjunction with the switches to allow a user to provide operational input. For example, the display screen can be configured to show operational information and to facilitate operational feedback for the handheld projection device. A user can simply navigate around a menu on the operational display using the multi-directional switch to highlight a desired item or function, then select the desired item using the selector switch. Alternatively, the display can be a touch-sensitive screen, allowing a user to provide input to control the device or select options using a stylus, finger, or other pointing device. As shown in the block diagram of FIG. 8, the display 26 receives output from the microprocessor 102, and can also be configured to provide input to the microprocessor.

The display 26 can provide a wide variety of information. A default display setting can automatically display the date, time, and identity of a loaded program, for example. It can provide a menu that allows the user to select a desired game, video, or other content to be projected, to choose the game or display parameters, and select other operational parameters of the system. It can display game or video information, such as the name of the game or video, elapsed time of play, lives left, bonus conditions, etc. The display can also provide operational and error messages related to the device itself, and allow manipulation of operational parameters, such as battery life, external devices connected, program errors, and projection conditions such as color, brightness, angular (keystone) correction, etc.

Because the operational display 26 in this example does not provide the video image for the game or other projected content, it is not required to have high resolution or a fast refresh rate. Consequently, the display screen can be a relatively low resolution monochrome display, having just enough resolution for an operational or control display, and having a relatively slow refresh rate. These aspects of the operational display make it very economical and practical.

Figure 2:
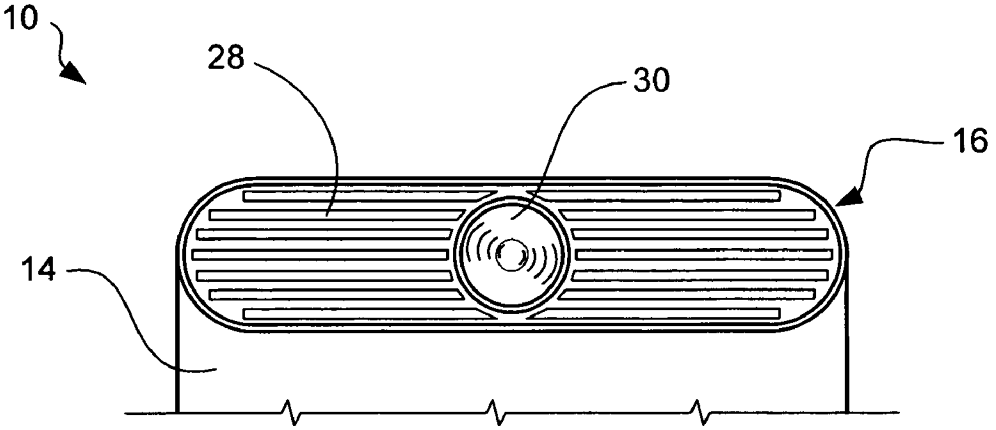
FIG. 2 is a partial front view of the gaming device embodiment of FIG. 1, showing the projection lens.
Figure 3:
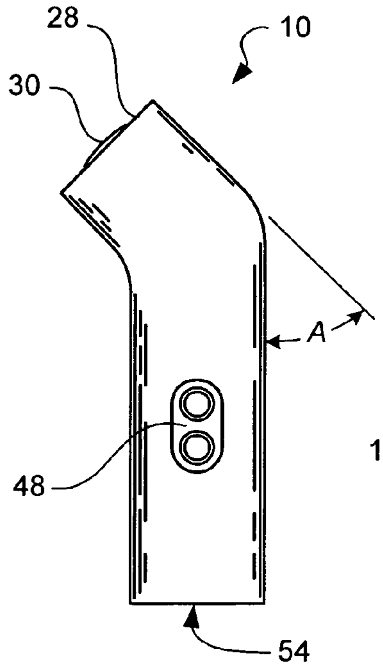
FIG. 3 is a side view of the gaming device embodiment of FIG. 1, showing the ergonomic angular configuration.

As shown in FIG. 3, the projector portion 16 extends forwardly from the control portion 14, and is oriented at an angle A relative to the control portion. As shown in FIG. 2, the front face 28 of the projector portion includes a projection lens 30 for projecting the image. The gaming device 10 includes a small projection device (110 in FIG. 8). As shown in FIG. 8, the microprocessor 102 provides signals to the projector, which produces and projects the visual image. Any of a variety of types of projector technologies can be used, such as LCD, digital light processor (DLP), light emitting diode (LED) or laser projection systems. The projection lens allows the device to project the video image forwardly onto a remote projection surface. The projection device can be configured to provide a suitable brightness for viewing in a variety of ambient lighting conditions, and the projection brightness can be adjustable, either manually or automatically.

While the embodiments shown in the figures are configured with the projector portion oriented at a downward projection angle A, as shown in FIG. 3, the angular orientation could be otherwise, such as upward or sideways, if desired. In the embodiment shown in FIG. 3, the downward angle A of the projector portion is about 45°, though other angles can be used. As shown in FIG. 7, this angle allows the device to be held comfortably in the hands 20 of a user at a comfortable angle, while the image 32 is projected to a nearby projection surface. For example, when the control portion 14 is held generally horizontally, as shown in FIG. 7, the projector portion 16 will project the image forwardly and downwardly onto the floor 34 or other generally horizontal projection surface.

On the other hand, it will be apparent that when a user holds the device 10 with the control portion 14 at an angle relative to the ground (e.g. about 45°), the projector portion 16 will naturally project the image generally horizontally, allowing the image to be projected onto a vertical surface, such as a wall (not shown). This configuration allows the device to project the image onto any desired nearby surface, and even allows the user to change the projection location at any time, allowing the user to move freely and change positions whenever desired during use.

The controller (100 in FIG. 8) can be configured to compensate for various projection parameters, such as projection/viewing angle, projection distance, color, and texture of the projection surface. The controller can be configured to automatically adjust the focus, color, and/or brightness of the projected image to compensate for the characteristics of the projection surface.

Figure 6:
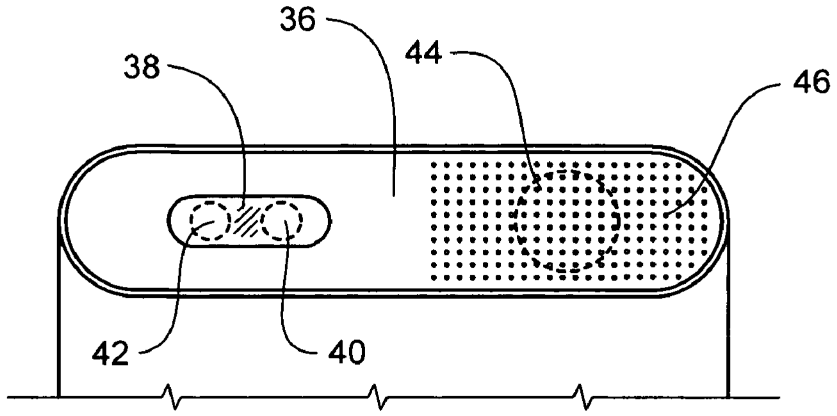
FIG. 6 is a partial front view of another embodiment of a portable projection gaming device having an alternative projection lens configuration.

In one embodiment, the device 10 includes an optical detection system for detecting and compensating for these projection parameters. The optical detection system can take various forms. A partial view of the front face 36 of an embodiment having an optical detection system is shown in FIG. 6. This embodiment includes a compound lens 38, behind which are a projection lens 40 and camera lens 42. The camera lens is associated with a digital camera system (112 in FIG. 8) such as a charge coupled device (CCD) or complimentary metal-oxide semiconductor (CMOS) device The camera repeatedly captures an image of the projected image, and provides this image to the microprocessor 102, which compares the intended projection qualities of the image with its actually detected projection qualities. If the reflected image varies from certain desired parameters in color, brightness, etc., the device can automatically adjust its output accordingly. For example, if the projection surface (34 in FIG. 7) is a colored surface, this can interfere with the intended projection colors. Because the colors of the projected image are naturally reflected back to the camera lens, these can be detected and analyzed by the microprocessor in the gaming device. The device can then alter certain projection colors to compensate. Likewise, the detected brightness of the image reflected to the camera can be used to automatically adjust the projection brightness.

Color, brightness, and focus detection and compensation can involve the use of a test screen of a known brightness, color and configuration, which is configured to produce a reflected image of known qualities to the camera. This test screen can be projected upon initial setup of the device for any given setting, and/or it can be periodically projected during ordinary use of the device, such as for a very short duration (e.g., below the threshold of human perception). The test screen can include elements to indicate focus, and standard color elements, for example. If the reflected image detected by the camera varies (outside a range of tolerance) from the known parameters of the test screen in color, brightness, or focus, the device can automatically compensate by adjusting output for these parameters. It will also be apparent that the system can be configured for adjustment of these parameters by the user with the device in a setup mode, in addition to or in place of the automatic adjustment feature.

The texture of the projection surface (e.g. a smooth painted wall versus a rough carpeted surface) will also affect the quality of the reflected image captured by the camera. The texture of the projection surface can affect several aspects of the reflected image, including brightness, contrast, color, and other optical properties. Upon detection of any or all of these parameters of the reflected image, in the manner described above, the microprocessor in the gaming device can adjust the brightness, contrast, and other parameters of the projected image to compensate for surface texture.

The camera can also detect the projection distance and angle in a similar way. In one embodiment, this can be done by including a test shape or figure of known geometry in the test screen. The size and apparent shape of the test shape will vary depending upon the projection distance and angle. Where the projection distance is greater, the test shape will appear smaller in an image captured by the camera. The gaming device 10 can then adjust for focus and other parameters (e.g. brightness) accordingly. Similarly, the apparent shape of the test shape will vary depending upon the projection angle, with certain dimensions of the test shape being foreshortened due to the angle of the projection surface. With a suitably selected test shape, the device can determine the angle and direction of slope of the projection surface based upon the apparent shape detected by the camera. The device can then adjust the keystone correction (with respect to either or both of the x and y axes, for example) of the projected image, so that the viewer can see a properly shaped image even when the projection surface is at an angle.

A ranging mechanism (114 in FIG. 8) can also be used to detect the distance from the projection device to the projection surface. The embodiment of the front face 36 shown in FIG. 6 includes an emitter/receiver 44 for the ranging mechanism, disposed behind a grating 46, though it will be apparent that different configurations can be used, depending upon the type and characteristics of the ranging mechanism. The emitter/receiver can emit and receive signals, which are then provided to the microprocessor 102 for determining the projection distance. These signals can be sound waves (e.g. ultrasonic, etc.) electromagnetic signals (e.g. infrared, etc.) or other suitable signals. Such range-finder devices are commonly used in auto-focus cameras, video recorders, and the like. Detecting the distance can allow the device to automatically adjust the focus of the image, or adjust the projection light output depending upon the distance, or other parameters.

The portable projection gaming device 10 can also include a wide variety of external device connection ports, as shown in FIGS. 1 and 3-5. For example, as shown in FIGS. 1 and 3, the device can include an audio output connection 48 that can be used for audio headphones, allowing a user to use the device in privacy, and with minimal disruption to others. Alternatively, the audio output connection can also be used for one or more external audio speakers (not shown), if desired. The block diagram of FIG. 8 shows an audio synthesizer 116, associated with the controller 100, which receives signals from the microprocessor 102, and provides audio output to a speaker 118 and/or a headphone connection 48.

Figure 5:
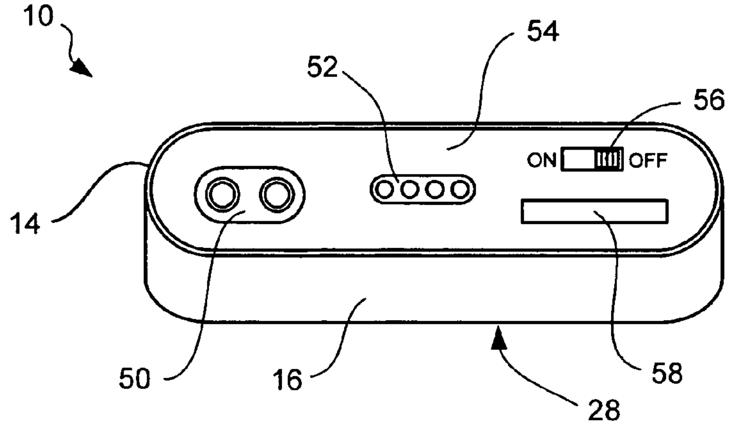
FIG. 5 is a bottom view of the gaming device embodiment of FIG. 1, showing the ports for interchangeable media devices, and other device and data connections.

As shown in FIG. 5, the bottom side 54 of the device 10 can include a power cable connection port 50 and an on/off switch 56 for controlling power to the device. It will be apparent that the portable projection gaming device is most likely to be powered by direct current (DC). For portability purposes, non-rechargeable or rechargeable batteries (122 in FIG. 8) can be installed in a suitable battery compartment (not shown) in the device to provide the required DC power. The power cable connection port 50 allows the device to be alternatively powered through a direct connection to household electrical current (e.g. 120 v AC, with a suitable DC transformer), and also allows recharging of rechargeable batteries, if used. Systems that are configured to use either household current or battery power are well known and widely used with laptop computers, cell phones, PDAs and other portable electronic devices.

The functional components of an embodiment of the power supply system are shown in the block diagram of FIG. 8. This diagram shows the external power connection port 50 and battery 122. These two complimentary power sources are connected to the controller 100 through the on/off switch 56. Where rechargeable batteries are used, a connection from the external power connection port can extend to recharging circuitry 124, which allows the batteries to be recharged whenever the device is connected to external power. The recharging circuitry can be separate from the controller, as shown, or it can be included as part of the controller.

Referring back to FIG. 5, the bottom side 54 of the device 10 can also include a data cable port 52. This port can be used to provide a connection to an external computing device to allow a user to download information such as other game programs, movies, etc. Additionally, the data port can allow two or more users to connect their devices to each other to allow multiple players to simultaneously participate in a single game, and can also allow the device to be connected to an external data input device, as described in more detail below.

The device 10 can also include a port 58 for receiving interchangeable media devices (not shown), such as game cartridges, flash memory cards, etc. The interchangeable media can include a wide variety of data for use with or by the projection device. For example, game cartridges or flash memory cards can provide program information, such as game programs, movies and video, data files, etc. The block diagram of FIG. 8 shows the data connection 52 and interchangeable media port 58. As shown in this diagram, these elements of the system provide information to the microprocessor 104. Individual game programs and other data, including programs received via the data connection and/or interchangeable media port, are provided to the microprocessor, and can be stored in RAM 108 for use by the microprocessor. Additionally, output and/or feedback from the microprocessor can also be provided through the data and interchangeable media connections for storage on storage media, or for use by an externally connected device.

Figure 9A:
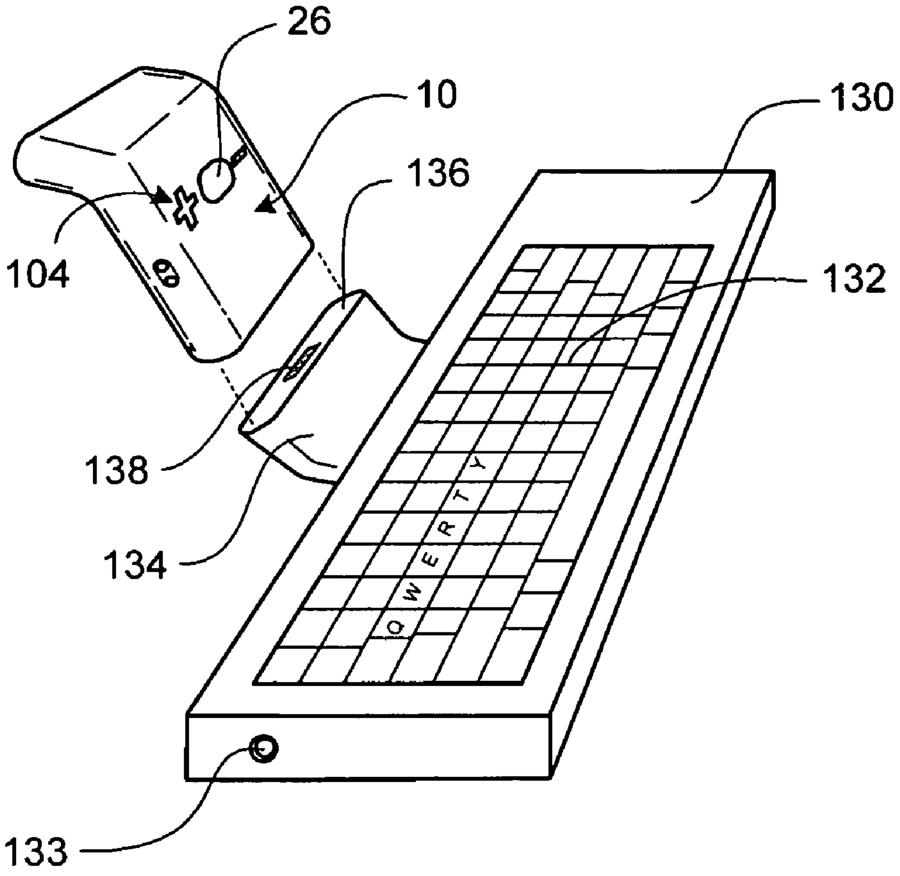
FIG. 9A is a perspective view of an embodiment of a portable projection gaming system including a keyboard with a docking support for mounting a portable projection gaming device.
Figure 9B:
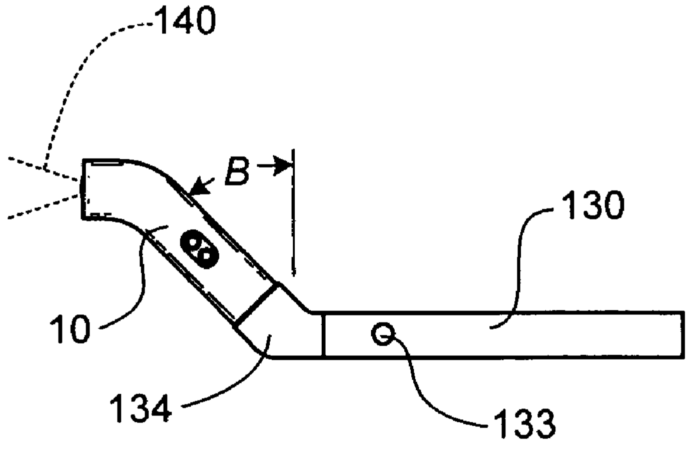
FIG. 9B is a side view of the system of FIG. 9, showing the mounting configuration of the projection device.

One type of external device that can be used with the portable projection gaming device 10 is an external keyboard 130, shown in FIGS. 9A and 9B. The keyboard is configured to sit upon a generally horizontal support (e.g. a table top, a desk top, a user's lap, etc.) and is arranged like a conventional computer keyboard, with a plurality of keys 132 that can be arranged in the typical QWERTY configuration, as shown in the figures. The keyboard includes a mounting arm 134 that has a mounting face 136 with a data connection 138. The mounting face is configured to receive the portable projection gaming device 10 with the data connection 52 of the device mated to the data connection 138 of the mounting arm. The mounting arm can also include a latching mechanism and other supporting structure (not shown) for providing a secure connection.

While the keyboard 130 shown in FIGS. 9A and 9B is a standard QWERTY keyboard, other types of external user input devices can be used. For example, the keyboard can be any type of standard user input device or even a special purpose user input device, for example, configured for a specific game (e.g., with special controls needed for game play, etc.), or configured for specific user needs (e.g., sized for user, arranged for use with physical handicaps, etc.). In addition, the keyboard can also include one or more additional connection ports, such as a connection port 133, for connection to other external devices, such as a mouse, joystick, etc. This can be desirable for use with many game programs and other applications of the projection gaming system.

When the gaming device is attached to the mounting arm 134, a user can provide input to the device through the keyboard 130, or through an external device connected to the connection port 133. This input is transmitted to the microprocessor (102 in FIG. 8) via the data connection (52 in FIG. 8). This provides a projection gaming system that can receive personal computer-type input, or other input types, allowing a greater diversity of programs to be used, and allowing an input type that may be more familiar to some users, or more appropriate for certain applications. When connected to the keyboard, the gaming device can be configured to take input from the keyboard alone, or it can be configured to take input from both the keyboard and the control devices 104 of the gaming device. When the keyboard is used for input and control of the gaming device, the display 26 of the gaming device can provide feedback to the user (e.g. control menus, status displays, etc.).

A side view of the gaming device 10 attached to the keyboard 130 is provided in FIG. 9B. The mounting face 136 can be oriented upwardly and at an angle B. Angle B can be complimentary to angle A (e.g. the sum of A and B is equal to 90°), so that when the gaming device 10 is mounted to the keyboard the gaming device will project the image beam 140 substantially horizontally. Alternatively, angle B can be selected to provide a different projection angle.

In its various forms, the portable projection gaming system disclosed herein combines micro portable projection technology and an ergonomic form factor to create a new handheld gaming experience. The curved shape allows the user to view the projected image while still able to hold the unit at a comfortable usage position. The device may be configured to automatically compensate for a variety of projection parameters, including the distance, angle, color, and/or texture of the projection surface. The result is a portable gaming system that can provide a large, high-resolution video image, and can be used virtually anywhere.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A handheld gaming system, comprising:

a handheld gaming device, configured to be held in a handheld position and to project a video image onto a remote projection surface, the handheld gaming device including a control portion, configured to face a user during use of the gaming device, having at least one control device configured for interactive manipulation by the user; and a projector portion coupled to the control portion and configured to project the video image downwardly and generally oppositely from the control portion and away from the user when the control portion faces the user; and an external user input device, configured to operably couple to and support the handheld gaming device and having at least one control device configured for interactive manipulation by the user.

2. A handheld gaming system in accordance with claim 1, wherein the external user input device supports the handheld gaming system with the control portion at an upward angle.

3. A handheld gaming system in accordance with claim 2, wherein the upward angle of the external user input device is substantially complimentary to the downward projection angle of the projector portion of the handheld gaming device, thereby projecting the video image substantially parallel to a support surface supporting the external user input device.

4. A handheld gaming system in accordance with claim 2, wherein the external user input device comprises a keyboard, configured to be supported upon a substantially horizontal support surface, having a support arm extending therefrom, the support arm having a support surface disposed at the upward angle and configured to receive and support the handheld gaming device.

5. A handheld gaming system in accordance with claim 4, wherein the keyboard includes a data connection port, disposed upon the support surface, and the handheld gaming device includes a data connection port disposed upon a bottom end thereof, the data connection port of the keyboard being configured to mate with the data connection port of the handheld gaming device to allow data exchange therebetween.

6. A handheld gaming system in accordance with claim 1, wherein the handheld gaming device is configured to simultaneously receive operational input from the at least one control device of the control portion, and from the external user input device.

7. A handheld gaming system in accordance with claim 2, wherein the downward angle of the projector portion is about 45°.

8. A handheld gaming system in accordance with claim 1, wherein the control portion includes a multi-position directional switch control device and a selection switch control device.

9. A handheld gaming system in accordance with claim 1, the control portion further comprising a display screen configured to display operational information.

10. A handheld gaming system in accordance with claim 1, further comprising an external device connection port configured to connect to an external device selected from a group of external devices comprising an audio headphone, a speaker, a power supply, an interchangeable media device, and a computing device.

11. A handheld gaming system in accordance with claim 1, further comprising an interchangeable media port configured to receive an interchangeable media device.

12. A handheld gaming system in accordance with claim 1, further comprising an optical detection system configured to detect an image projection parameter and to cause the projector portion to alter the video image based on the image projection parameter.

13. A handheld gaming system in accordance with claim 12, wherein the image projection parameter is selected from a group of image projection parameters consisting of a projection distance, a projection angle, a color of a projection surface, and a texture of a projection surface.

14. A handheld gaming system in accordance with claim 12, wherein the optical detection system includes a ranging mechanism that is configured to detect a projection distance parameter using a sound wave or an electromagnetic signal.

15. A handheld gaming system in accordance with claim 12, wherein the optical detection system includes a camera.

16. A gaming system, comprising:

a handheld gaming device, configured to be held in a handheld position, including a control portion, having means, configured to face a user during use of the gaming device, for manually controlling the handheld gaming device; and means for projecting a video image forwardly and at a downward projection angle generally oppositely from the control portion and away from the user when the control portion faces the user, onto a remote surface; and an external user input device, configured to operably couple to and support the handheld gaming device at an upward angle, including at least one control device configured to allow control of the handheld gaming device.

17. A gaming system in accordance with claim 16, wherein the upward angle of the external user input device is substantially complimentary to the downward projection angle of the means for projecting the video image, thereby projecting the video image substantially parallel to a support surface supporting the external user input device.

18. A gaming system in accordance with claim 16, wherein the external user input device comprises a keyboard, configured to be supported upon a substantially horizontal support surface, having a support arm extending therefrom, the support arm having a support surface disposed at the upward angle and configured to receive and support the handheld gaming device.

19. A gaming system in accordance with claim 16, further comprising means, associated with the control portion, for displaying operational information and providing operational feedback for a user of the device.

20. A gaming system in accordance with claim 16, further comprising means for detecting and allowing compensation for at least one of projection distance, projection angle, color of projection surface, and texture of the projection surface.

21. A gaming system in accordance with claim 16, further comprising means for receiving interchangeable media containing data for use by the gaming device.

22. A method for providing a video image for a portable gaming system, comprising the steps of:

providing a hand-holdable gaming device having a control portion configured to face a user during use of the gaming device, with control devices configured for manipulation by the user, and a projector portion oriented to project downwardly and generally oppositely from the control portion and away from the user when the control portion faces the user;

connecting the gaming device to an external input device configured to support the gaming device upwardly at an angle, thereby projecting a video image forwardly and at a projection angle relative to the control portion and the external input device, onto a remote projection surface; and controlling the gaming device via at least one control device of the external input device.

23. A method in accordance with claim 22, further comprising the step of displaying operational information and providing operational feedback to a user of the projection device via a display associated with the control portion.

24. A method in accordance with claim 23, further comprising the step of detecting and compensating for at least one of projection distance, projection angle, color of projection surface, and texture of the projection surface, via an optical detection system.

25. A method in accordance with claim 22, further comprising the step of receiving data for use by the projection device via an interchangeable media device attached at an interchangeable media port of the portable projection device.

26. A gaming system, comprising:

a handheld gaming device having a substantially integral body, configured to be held in a user's hands, having a control portion, configured to face a user during use of the gaming device, including control devices configured for manipulation by the user; and a projector portion, oriented at a downward angle generally oppositely from the control portion, and configured to project a video image downwardly and forwardly and away from the user when the control portion faces the user onto a remote projection surface; and an external user input device, configured to operably couple to and support the handheld gaming device at an upward angle, including at least one control device configured to allow control of the handheld gaming device.

27. A handheld gaming system in accordance with claim 26, wherein the projector portion is oriented at a downward angle of about 45° relative to the control portion.

28. A handheld gaming system in accordance with claim 26, further comprising a display screen, disposed on the control portion, configured to display operational information and provide operational feedback for the handheld projection device.

29. A handheld gaming system in accordance with claim 26, further comprising an optical detection system configured to detect and compensate for at least one of projection distance, projection angle, color of projection surface, and texture of the projection surface.

30. A handheld gaming system in accordance with claim 26, further comprising an interchangeable media port, configured to receive an interchangeable media device containing data for use by the gaming device.

* * * * *